United States Patent [19]

Feng

[11] Patent Number: 5,374,936

[45] Date of Patent: Dec. 20, 1994

[54] SECURITY SYSTEM

[76] Inventor: Jun Feng, 150 Allston St., Cambridge, Mass. 02139

[21] Appl. No.: 202,504

[22] Filed: Feb. 28, 1994

[51] Int. Cl.$^5$ .............................................. G01S 3/02
[52] U.S. Cl. .................................... 342/457; 455/54.1
[58] Field of Search ................... 342/457, 463, 353; 455/13.1, 53.1, 54.1; 340/539

[56] References Cited

U.S. PATENT DOCUMENTS

| | | | |
|---|---|---|---|
| 4,468,656 | 8/1984 | Clifford et al. | 340/539 |
| 4,495,495 | 1/1985 | Ormanns et al. | 340/825.45 |
| 4,611,198 | 9/1986 | Levinson et al. | 340/539 |
| 4,630,035 | 12/1986 | Stahl et al. | 340/539 |
| 4,764,757 | 8/1988 | DeMarco et al. | 340/574 |
| 4,868,859 | 9/1989 | Sheffer | 379/39 |
| 5,027,383 | 6/1991 | Sheffer | 379/39 |
| 5,032,845 | 7/1991 | Velasco | 342/457 |
| 5,055,851 | 10/1991 | Sheffer | 342/457 |
| 5,115,224 | 5/1992 | Kostusiak et al. | 340/574 |
| 5,210,540 | 5/1993 | Masumoto | 342/357 |
| 5,223,816 | 6/1993 | Levinson et al. | 340/539 |
| 5,223,843 | 6/1993 | Hutchinson | 342/352 |
| 5,223,844 | 6/1993 | Mansell et al. | 342/357 |

OTHER PUBLICATIONS

Encyclopedia excerpt entitled, "LORAN", based upon material from Bibliography: J. A. Hall, "Radar Aids to Navigation", 1947,; J. A. Pierce, A. A. McKenzie, and R. H. Woodward, Loran, 1948; P. C. Sandretto, "Electronic Avigation Engineering", 1958.

Primary Examiner—Theodore M. Blum
Attorney, Agent, or Firm—Weingarten, Schurgin, Gagnebin & Hayes

[57] ABSTRACT

A security system provides accurate positioning, in a two or three dimensional coordinate system, of an alarm signal transmitter which emits an alarm signal upon activation by a user. The security system includes at least three relay stations, at least one portable signal transmitter, and a central station. The alarm signal from the signal transmitter is received by the relay stations at different time intervals or with different intensities. The time or intensity data are then sent to the central station for processing, wherein the coordinates of the signal transmitter are quickly determined by solving a set of equations based on these data. The accuracy of the coordinates of the signal transmitter depends on accuracy of the measured time or intensity data.

10 Claims, 8 Drawing Sheets

SECURITY SYSTEM

FIELD OF INVENTION

The present invention relates to positioning systems, and more particularly to personnel security systems.

BACKGROUND OF THE INVENTION

A security systems are known for locating a user upon activation of a signal transmitter. For example, U.S. Pat. No. 5,223,816, to Levinson et al., discloses a system that can only detect a large zone within which the user, who activated a transmitter, is located. A long time searching in this zone is then needed to find the user. This system is thus neither fast nor accurate. U.S. Pat. No. 5,223,844, to Mansell et al., discloses a system for vehicle tracking that uses a global positioning satellite signal. However, the system must depend on the global position system and is only applicable to vehicles.

SUMMARY OF THE INVENTION

A security system is provided comprising at least three relay stations, at least one portable signal transmitter, and one central station. The locations of relay and central stations are predetermined during positioning process in a 2 or 3 dimensional coordinate system on or above the earth. The portable signal transmitter can emit an alarm signal which includes a unique identification code for the signal transmitter. The signal transmitter can be activated directly or remotely, actively or passively.

In a first embodiment of the security system, a very accurate timer is associated with each of the relay stations. The signal transmitter emits an alarm signal including an identification code for the signal transmitter to which the timer is responsive for registering a first event. The central station transmits an encoded calibration signal periodically or upon receiving the alarm signal from the signal transmitter. Each of the relay stations is responsive to the calibration signal for triggering its timer again as a second event. Each relay station then generates a data signal including information regarding the time interval data between the two timer triggering events and codes associated with the signal transmitter and the relay station for transmission to the central station. The central station receives each of the data signals and processes all the time interval data to determine the coordinates of the signal transmitter in accordance with a set of equations.

In a second embodiment of the invention, a very accurate timer is associated with the central station. The signal transmitter emits a first alarm signal including an identification code of the signal transmitter. Each of the relay stations receives this first alarm signal and immediately sends out a second alarm signal to the central station. The second alarm signal includes the identification codes of both the signal transmitter and relay station. The central station receives, from each of the relay stations, the second alarm signal which triggers the timer in the central station. Meanwhile, the central station transmits an encoded first calibration signal periodically or upon receiving the first alarm signal from the signal transmitter. The first calibration signal is received by each of the relay stations. Each of the relay stations receives this first calibration signal and immediately sends out a second calibration signal to the central station. The second calibration signal includes the identification codes of both the first calibration signal and the relay station. The central station receives, from each of the relay stations, the second calibration signal which triggers the timer in the central station. The time intervals represented by the difference between the two timer triggering events for each of the relay stations are processed by a computer using a set of equations for determining the coordinates of the signal transmitter.

In a third embodiment of the invention, a very accurate signal intensity meter is associated with each of the relay stations. The signal transmitter emits an alarm signal including an identification code of the signal transmitter. Each of the relay stations receives this alarm signal, and its intensity is measured by the intensity meter at the relay station. Meanwhile, the central station transmits an encoded calibration signal periodically or upon receiving the alarm signal from the signal transmitter. The calibration signal is received by each of the relay stations and its intensity is measured by the intensity meter for calibration purposes. Each of the relay stations then emits a data signal to the central station. Each of the data signals carries information including the intensity data of both the alarm and calibration signals, as well as the identification codes of both the signal transmitter and the relay station. When the central station receives the data signal, the intensity data are processed by a computer using a set of equations for determining the coordinates of the signal transmitter.

With respect to each of the embodiments, the exact type of calibration is not a limitation as other calibration techniques are contemplated.

BRIEF DESCRIPTION OF THE DRAWINGS

A more complete understanding of the present invention and attendant advantages and features thereof will be more readily understood by reference to the following detailed description when considered in conjunction with the accompanying drawings wherein.

DETAILED DESCRIPTION OF THE ILLUSTRATIVE EMBODIMENTS

Figure 1:
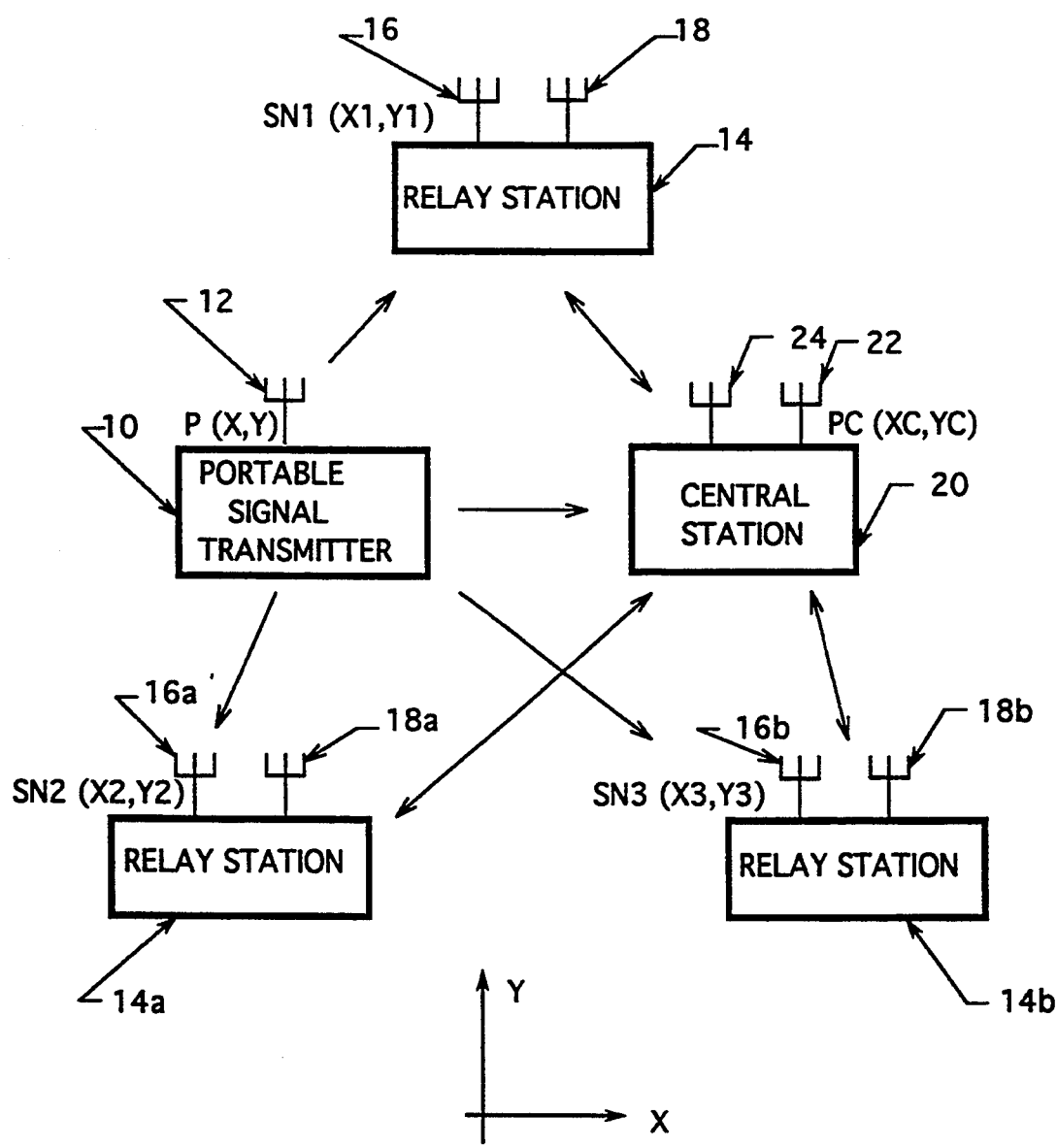
FIG. 1 is a block diagram of a security system adapted for two dimensional positioning.

FIG. 1 is a block diagram of a security system of the present invention that is capable of identifying the position of a portable signal transmitter 10, also referred to as "P", in a two dimensional coordinate system. The transmitter 10 includes an antenna 12 and is capable of transmitting an alarm signal including an identification code when it is activated.

Three relay stations 14, 14a, and 14b, referred to generally as relay stations 14, are positioned at predetermined locations in a two dimensional coordinate system (x-y) such that an overlapping area of coverage is produced for a given strength transmitter signal. The relay stations, also referred to as "SN1", "SN2" and "SN3" have known coordinates (x₁,y₁), (x₂,y₂) and (x₃,y₃), respectively. Only three relay stations are required to find the coordinates (x,y) of the signal transmitter 10 as will be described hereinbelow. However, if extra relay stations are provided, the measured data can be used to verify the accuracy of the coordinates.

Each of the relay stations 14, 14a, and 14b has a receiving antenna 16, 16a, and 16b, respectively, to receive alarm and calibration signals as well as a transmitting antenna 18, 18a, and 18b, respectively to transmit alarm, calibration, and data signals.

A central station 20, also referred to as "PC" is positioned in a predetermined location within the signal transmission range of the relay stations. The central station 20, having coordinates (xc,yc) includes a transmitting antenna 22 and is capable of transmitting a calibration signal. The central station also includes a receiving antenna 24 for receiving an alarm signal and other data signals.

The term "signal" includes any portion of the electromagnetic spectrum suitable for transmission of information over distance but is not limited to it. Other type of waves such as audio, acoustic, and ultrasonic waves are considered as part of the term "signal". The signals may be transmitted between the relay stations and the central station from the antennas, or alternatively through a telephone line or the like. The signals are distinguished from each other, for example, by individual identification codes or by differing frequencies.

Figure 2:
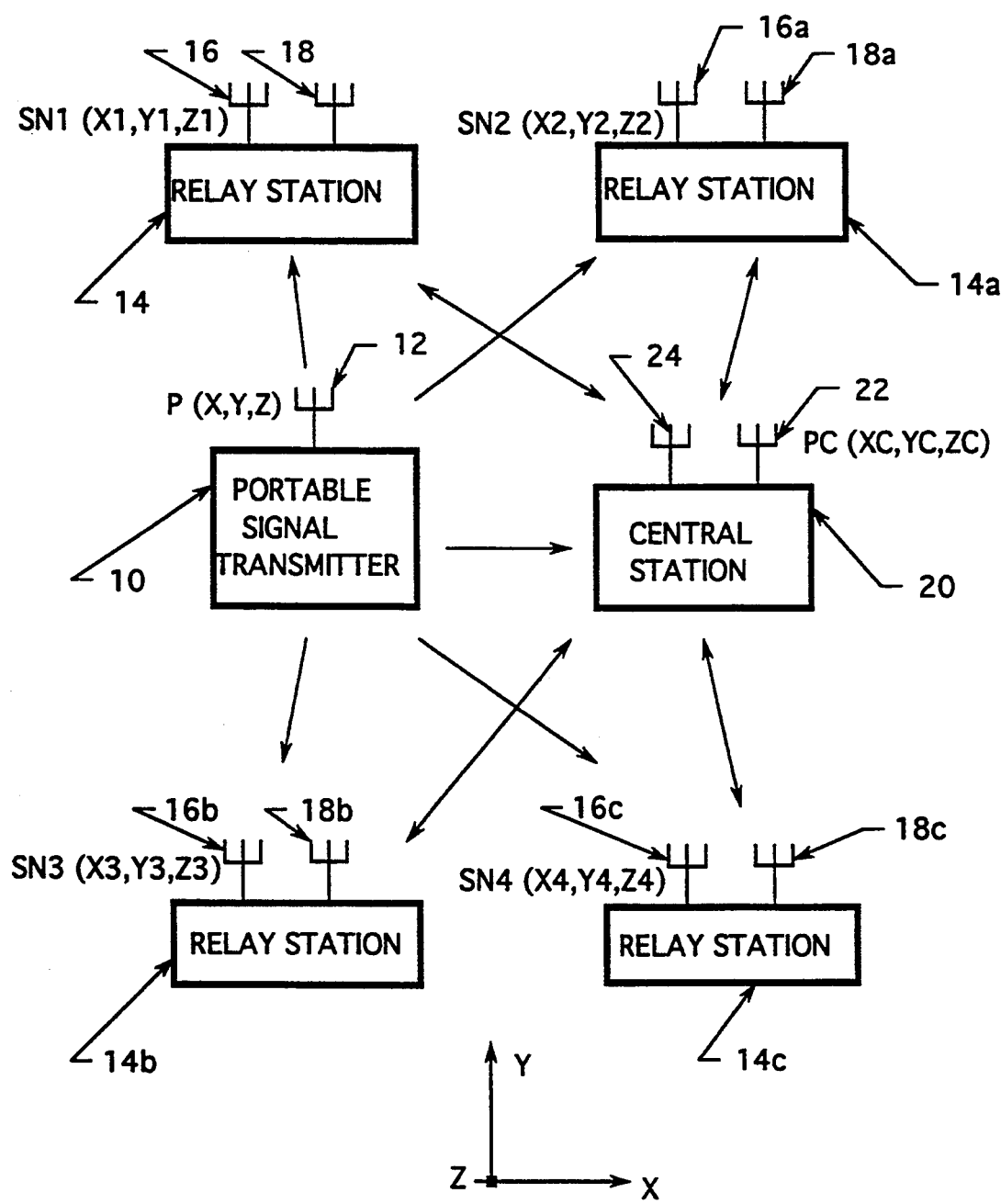
FIG. 2 is a block diagram of a security system for three dimensional positioning.

FIG. 2 is a block diagram for an embodiment of the security system capable of three dimensional positioning. This embodiment is similar to the embodiment of FIG. 1, and further includes a fourth relay station 14c, also referred to as SN4, having coordinates (x₄,y₄,z₄).

The four relay stations 14, 14a, 14b, and 14c are positioned in predetermined locations in a three dimensional coordinate system (x-y-z) such that an overlapping three dimensional volume of coverage is provided. Although only four relay stations are required to determine the coordinates (x,y,z) of the signal transmitter 10 as described hereinbelow, if extra relay stations are provided, the measured data can be used to verify positioning of the transmitter 10.

Figure 3:
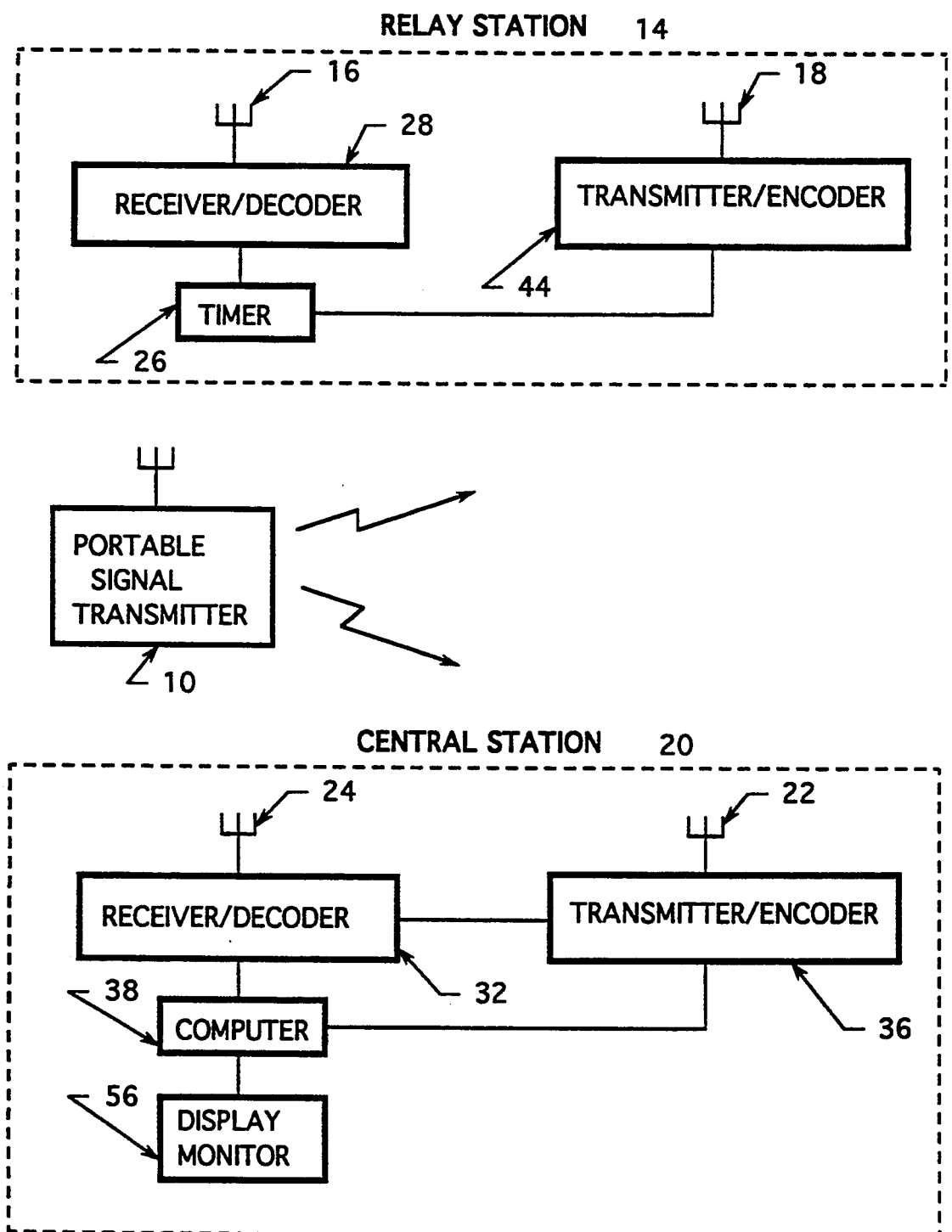
FIG. 3 is a block diagram of an exemplary relay station and central station of the security system.

FIG. 3 is a block diagram of an exemplary relay station 14 and the central station 20. The relay station 14 includes a high precision timer 26 which is a time measurement device such as a circuit, a clock, a time counter, a micro-processor, or an oscilloscope. Significantly, the greater the precision of the timer 26, the greater the accuracy of the calculated coordinates for the portable signal transmitter 10.

An alarm signal from the signal transmitter 10 is received by the antenna 16 of the relay station 14, wherein it is decoded by a receiver/decoder 28. The signal then triggers or starts the timer 26.

The alarm signal from the signal transmitter 10 is also received by the antenna 24 of the central station 20, wherein it is decoded by a receiver/decoder 32. The signal then triggers or activates the transmitter/encoder 36 which causes an encoded calibration signal to be emitted by the antenna 22. Alternatively, the calibration signal is emitted by the antenna 22 periodically, the emitting period being preset by a signal input from a computer 38 to the transmitter/encoder 36.

The calibration signal from the central station 20 is received by the antenna 16 in a relay station 14, wherein it is decoded by the receiver/decoder 28. The calibration signal then triggers the timer 26 again. Also, a time signal representing the interval between the triggering time of the alarm signal and the calibration signal is passed to a transmitter/encoder 44 that generates a data signal for transmission including the time interval data and individual identification codes of both the alarm signal transmitter 10 and each respective relay station 14.

The data signal is received by the central station 20, wherein it is decoded by the receiver/decoder 32. The time interval data from each of the relay stations 14 are input to the computer 38 for data processing, wherein the coordinates of the alarm signal transmitter are calculated by solving a set of equations based on the time interval data from each of the relay stations, as well as the coordinates of all the stations in the following manner.

Assuming a two dimensional positioning system in which there are three relay stations, $SN1(X_1Y_1)$, $SN2(x_2y_2)$, and $SN3(x_3y_3)$, the elapsed time for an alarm signal traveling from a signal transmitter $P(x, y)$ to each of the relay stations SN1, SN2 and SN3 is, respectively, $$t_1 = \frac{\sqrt{(x_1 - x)^2 + (y_1 - y)^2}}{v}$$

$$t_2 = \frac{\sqrt{(x_2 - x)^2 + (y_2 - y)^2}}{v}$$

$$t_3 = \frac{\sqrt{(x_3 - x)^2 + (y_3 - y)^2}}{v}$$

where v is a given signal velocity (e.g., $3 \times 10^8$ m/sec). The coordinates of the signal transmitter $P(x,y)$ are then obtained by solving the following equations, $$t_2 - t_1 = \frac{\sqrt{(x_2 - x)^2 + (y_2 - y)^2}}{v} - \frac{\sqrt{(x_1 - x)^2 + (y_1 - y)^2}}{v}$$

$$t_3 - t_2 = \frac{\sqrt{(x_3 - x)^2 + (y_3 - y)^2}}{v} - \frac{\sqrt{(x_2 - x)^2 + (y_2 - y)^2}}{v}$$

$$t_1 - t_3 = \frac{\sqrt{(x_1 - x)^2 + (y_1 - y)^2}}{v} -$$

-continued $$\frac{\sqrt{(x_3 - x)^2 + (y_3 - y)^2}}{v}$$

where $(t_2-t_1)$ is the difference of the elapsed time for the alarm signal arriving at the relay stations SN2 and SN1, $(t_3-t_2)$ is the difference of the elapsed time for the alarm signal arriving at the relay stations SN3 and SN2, and $(t_1-t_3)$, is the difference of the elapsed time for the alarm signal arriving at the relay stations SN1 and SN3. The values for $(t_2-t_1)$, $(t_3-t_2)$ and $(t_1-t_3)$ are obtained from the time data measured by the timers.

For a three dimensional positioning system in which there are four relay stations, $SN1(x_1,y_1,z_1)$, $SN2(x_2,y_2,z_2)$, $SN3(x_3,y_3,z_3)$, and $SN4(x_4,y_4,z_4)$. The coordinates of a signal transmitter $P(x,y,z)$ are obtained by solving the following set of equations, $$t_2 - t_1 = \frac{\sqrt{(x_2 - x)^2 + (y_2 - y)^2 + (z_2 - z)^2}}{v} -$$

$$\frac{\sqrt{(x_1 - x)^2 + (y_1 - y)^2 + (z_1 - z)^2}}{v}$$

$$t_3 - t_2 = \frac{\sqrt{(x_3 - x)^2 + (y_3 - y)^2 + (z_3 - z)^2}}{v} -$$

$$\frac{\sqrt{(x_2 - x)^2 + (y_2 - y)^2 + (z_2 - z)^2}}{v}$$

$$t_4 - t_3 = \frac{\sqrt{(x_4 - x)^2 + (y_4 - y)^2 + (z_4 - z)^2}}{v} -$$

$$\frac{\sqrt{(x_3 - x)^2 + (y_3 - y)^2 + (z_3 - z)^2}}{v}$$

where $(t_2-t_1)$ is the difference of the elapsed time for the alarm signal arriving at the relay stations SN2 and SN1, $(t_3-t_2)$ is the difference of the elapsed times for the alarm signal arriving at the relay stations SN3 and SN2, and $(t_4-t_3)$ is the difference of the elapsed time for the alarm signal arriving at the relay stations SN4 and SN3. The values for $(t_2-t_1)$, $(t_3-t_2)$ and $(t_4-t_3)$ are obtained from the time data measured by the timers. If more than four relay stations are provided, the extra data can be used to check the calculation accuracy. The exact expression of these equations is not a limitation of the present invention.

With respect to measurement and calibration of time data, the time interval measured by timers in relay station SN1 between two triggering moments is obtained as $\Delta t_1$. In the same manner, $\Delta t_2$, $\Delta t_3$ and $\Delta t_4$ are determined for relay stations SN2, SN3 and SN4, respectively.

The required time data are obtained from the relations, e.g., $$t_2-t_1=(ct_2-ct_1)-(\Delta t_2-\Delta t_1)$$

$$t_3-t_2=(ct_3-ct_2)-(\Delta t_3-\Delta t_2)$$

$$t_4-t_3=(ct_4-ct_3)-(\Delta t_4-\Delta t_3)$$

where $ct_1$, $ct_2$, $ct_3$ and $ct_4$ are the elapsed times of the calibration signal traveling from the central station to the relay stations SN1, SN2, SN3 and SN4, respectively. They can be obtained either by experiments or by calculations based upon the predetermined spatial relationship between a central station and relay stations.

Figure 4:
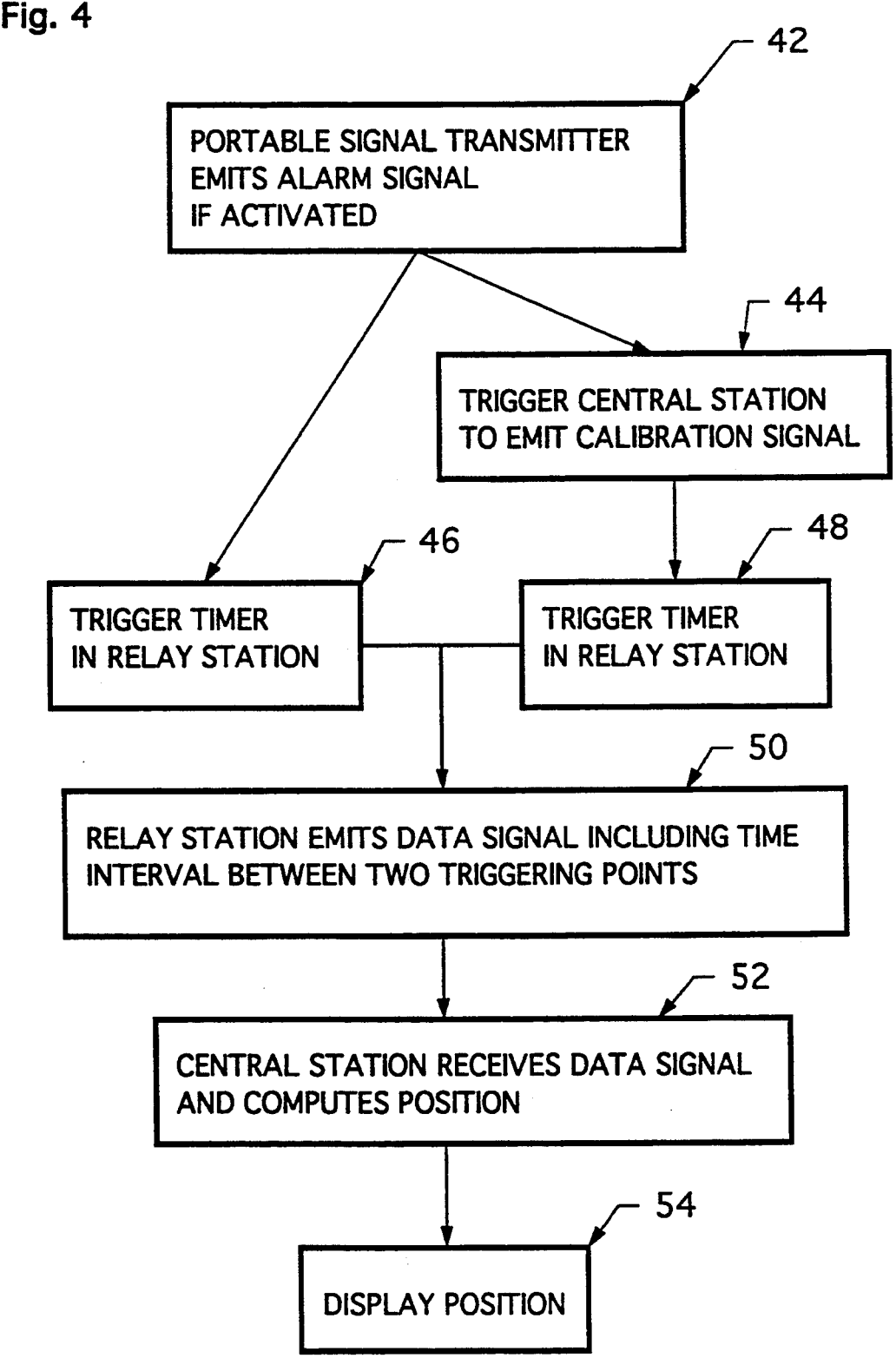
FIG. 4 is a flow chart of alarm, calibration and data signals for an embodiment of the security system including the relay stations and central station represented in FIG. 3.

FIG. 4 is a flow chart for the alarm, calibration and data signals in accordance with the embodiment of the security system shown in FIG. 3. As illustrated in FIG. 4, in a step 42, the signal transmitter 10 upon its activation emits an alarm signal including an identification code for the signal transmitter. In a step 44, the central station 20 transmits an encoded calibration signal periodically or upon receiving the alarm signal from the signal transmitter 10. In a step 46, each of the relay stations 14 receives the alarm signal which triggers the timer 26. In a step 48, the calibration signal arrives at each of the relay stations 14 and triggers the timer 26 again. In a step 50, each of the relay stations 14 emits a data signal to the central station 20, including the time interval data between two triggering points in each of the timers and the identification codes of both the signal transmitter 10 and relay station 14. In a step 52, when the central station 20 receives each of the data signals, all the time interval data are inputted into the computer 38 for processing. The coordinates of the signal transmitter 10 are determined by solving a set of equations, such as those illustrated hereinabove. In a step 54, the calculated coordinates of the portable signal transmitter 10 are sent to a monitor 56 (illustrated in FIG. 3) for display.

Figure 5:
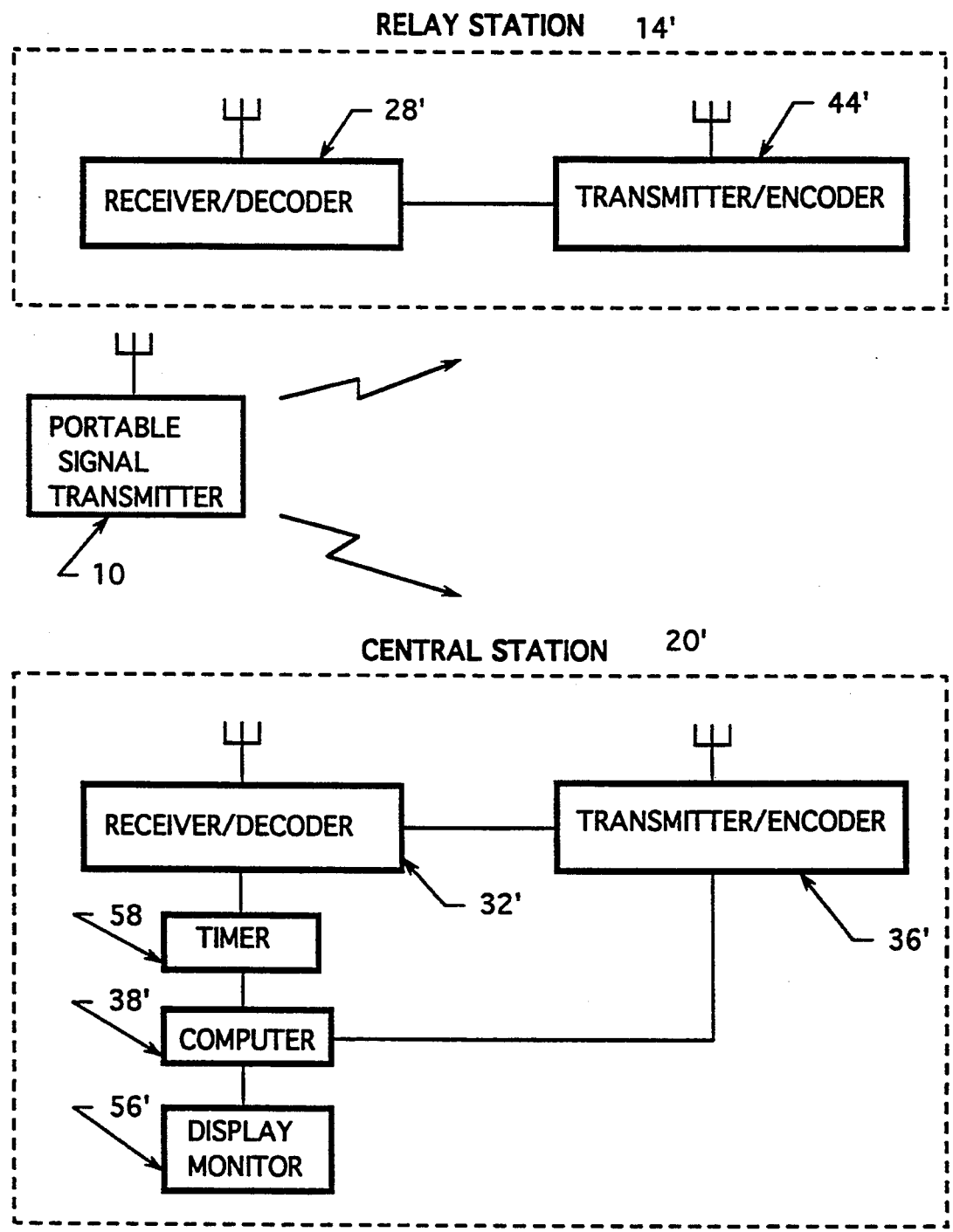
FIG. 5 is a block diagram of an alternative embodiment of a relay station and central station.

Whereas the embodiment of the security system described with respect to FIGS. 3 and 4 includes a timer 26 in each of the relay stations 14, in an alternative embodiment of the security system a timer can be associated with a central station 20' and not a relay station 14', as shown in the block diagram of FIG. 5.

Referring to FIG. 5, a first alarm signal from a signal transmitter 10 is received in the relay station 14' wherein the alarm signal is decoded by a receiver/decoder 28' and passed to a transmitter/encoder 44' which generates an encoded second alarm signal that is emitted. The second alarm signal, as well as the codes of the first alarm signal and the relay station, are received and decoded by a receiver/decoder 32' in the central station 20'. The decoded signal triggers a timer 58.

The first alarm signal from the signal transmitter 10 is also received in the central station 20' where it is decoded by the receiver/decoder 32'. The decoded first alarm signal triggers a transmitter/encoder 36' causing it to emit an encoded first calibration signal. Alternatively, the first calibration signal is emitted periodically, the emitting period being preset by a computer 38' in communication with the transmitter/decoder 36'.

The first calibration signal from the central station 20' is received in the relay station 14' where it is decoded by the receiver/decoder 28' and then triggers the transmitter/encoder 44' which emits an encoded second calibration signal. The second calibration signal, as well as the codes of both the first calibration signal and the relay station 14' are received and decoded by the receiver/decoder 32' in the central station 20'. The decoded signal then triggers the timer 58 again.

The time interval data for each of the relay stations are sent to the computer 38' for data processing. The coordinates of the alarm signal transmitter 10 are calculated by solving a set of equations, as illustrated above, based on the time interval data and the coordinates of all the stations. The result is sent to a display monitor 56'.

Figure 6:
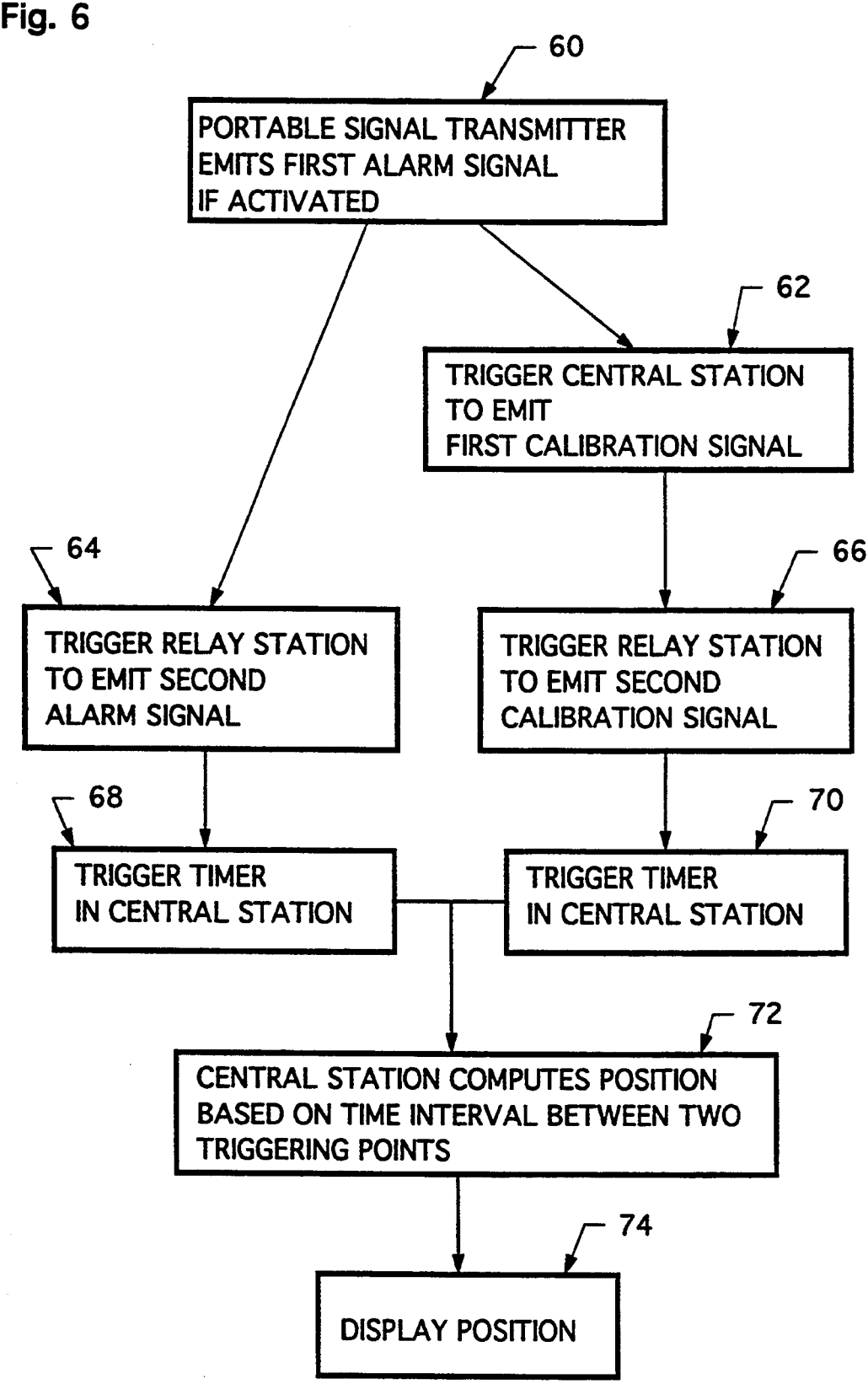
FIG. 6 is a flow chart of first and second alarm, and calibration signals for an embodiment of the security system including the relay stations and central station illustrated in FIG. 5.

FIG. 6 is a flow chart of the first and the second alarm and calibration signals in accordance with the embodiment of the security system shown in FIG. 5. In a step 60, the signal transmitter 10 upon its activation emits a first alarm signal including an identification code for the signal transmitter. In a step 62, the central station 20' transmits an encoded first calibration signal periodically or upon receiving the first alarm signal from the signal transmitter 10. In a step 64, each of the relay stations 14' receives this first alarm signal and immediately sends out a second alarm signal to the central station 20'. The second alarm signal includes the identification codes of both the signal transmitter 10 and relay station 14'.

In a step 66, the first calibration signal is received by each of the relay stations 14'. Each of the relay stations 14' receives this first calibration signal and immediately sends out a second calibration signal to the central station 20'. The second calibration signal incudes the identification codes of both the first calibration signal and the relay station 14'. In a step 68, the central station 20' receives from each of the relay stations 14' the second alarm signal which triggers the timer 58 in the central station 20'.

In a step 70, the central station receives from each of the relay stations 14' the second calibration signal which triggers the timer 58 in the central station 20'. In a step 72, the time interval between two triggering events represented by the second alarm signal and the second calibration signal for each of the relay stations 14' are inputted into the computer 38' for processing. The coordinates of the signal transmitter are determined by solving a set of equations as described above. In a step 74, the calculated coordinates of the portable signal transmitter 10 are sent to the monitor 56' for display.

Figure 7:
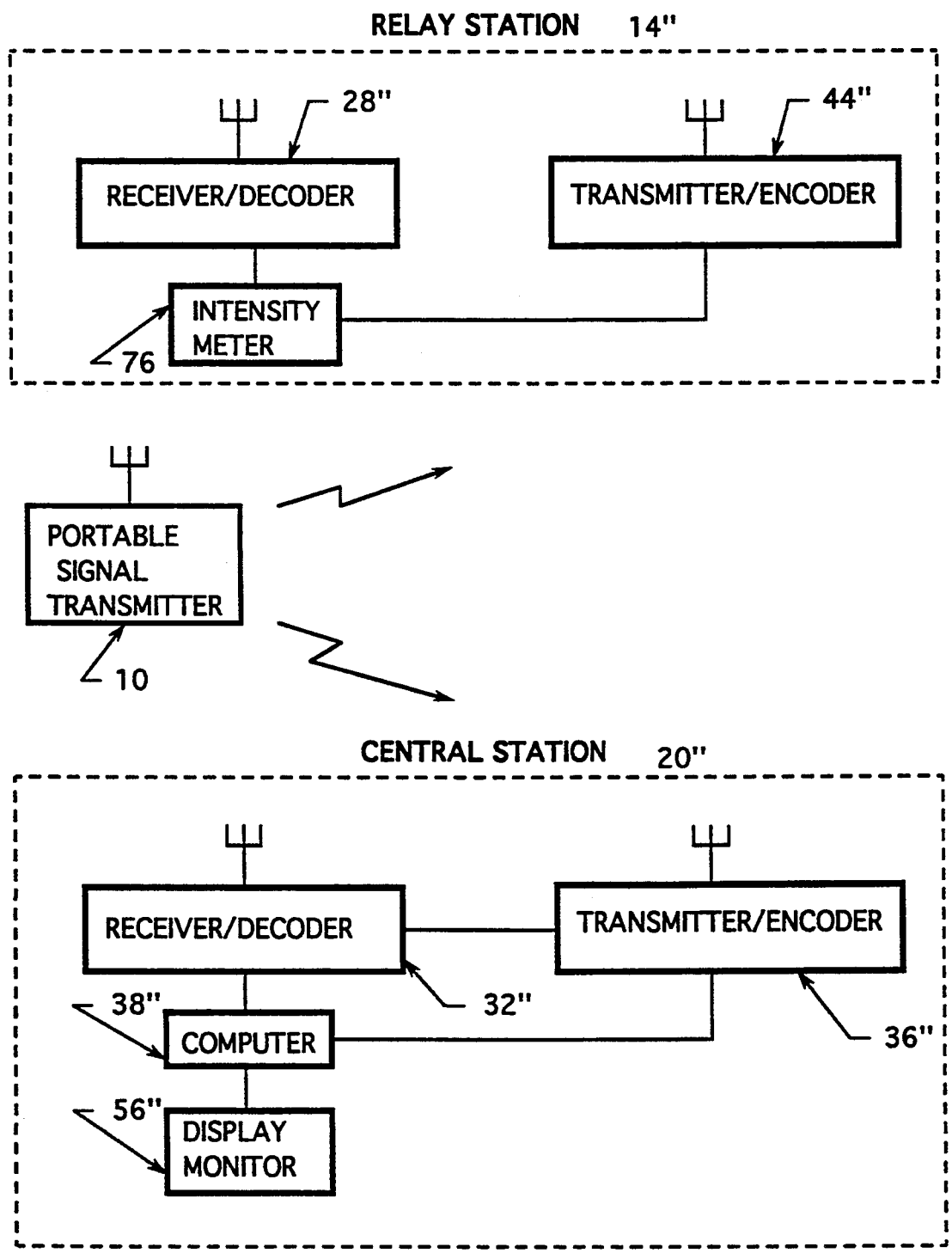
FIG. 7 is a block diagram of a third embodiment of the relay stations and central station.

In a third embodiment of the present invention, timers are not associated with either a relay station or a central station. Instead, an intensity meter 76 is associated with each of the relay stations. FIG. 7 is a block diagram of the third embodiment of a relay station 14" and a central station 20" for the security system. The very accurate signal intensity meter 76 can include a circuit, an oscilloscope, or other signal intensity measuring device as is known in the art. An alarm signal from an alarm signal transmitter 10 is received in the relay station 14" and is decoded by the receiver/decoder 28" and measured by the intensity meter 76.

The alarm signal from the alarm signal transmitter 10 is also received in the central station 20" and decoded by the receiver/decoder 32". The alarm signal then triggers the transmitter/encoder 36" causing it to emit an encoded calibration signal. Alternatively, the calibration signal is emitted periodically, the emitting period being established by a computer 38" via a signal path to a transmitter/encoder 36".

The calibration signal from the central station 20" is received in the relay station 14", decoded by the receiver/decoder 28", and evaluated by the intensity meter 76. The intensity data of the alarm and calibration signals measured by the intensity meter 76 are communicated to the transmitter/encoder 44" and a data signal including the intensity data and the identification codes of both the alarm signal and the relay station is emitted.

The data signal is received in the central station 20" and decoded by the receiver/decoder 32". The intensity data from the relay station 14" is processed by the computer 38" along with the coordinate data associated with all of the relay stations to determine the coordinates of the alarm signal transmitter 10, which are displayed on a monitor 56".

Figure 8:
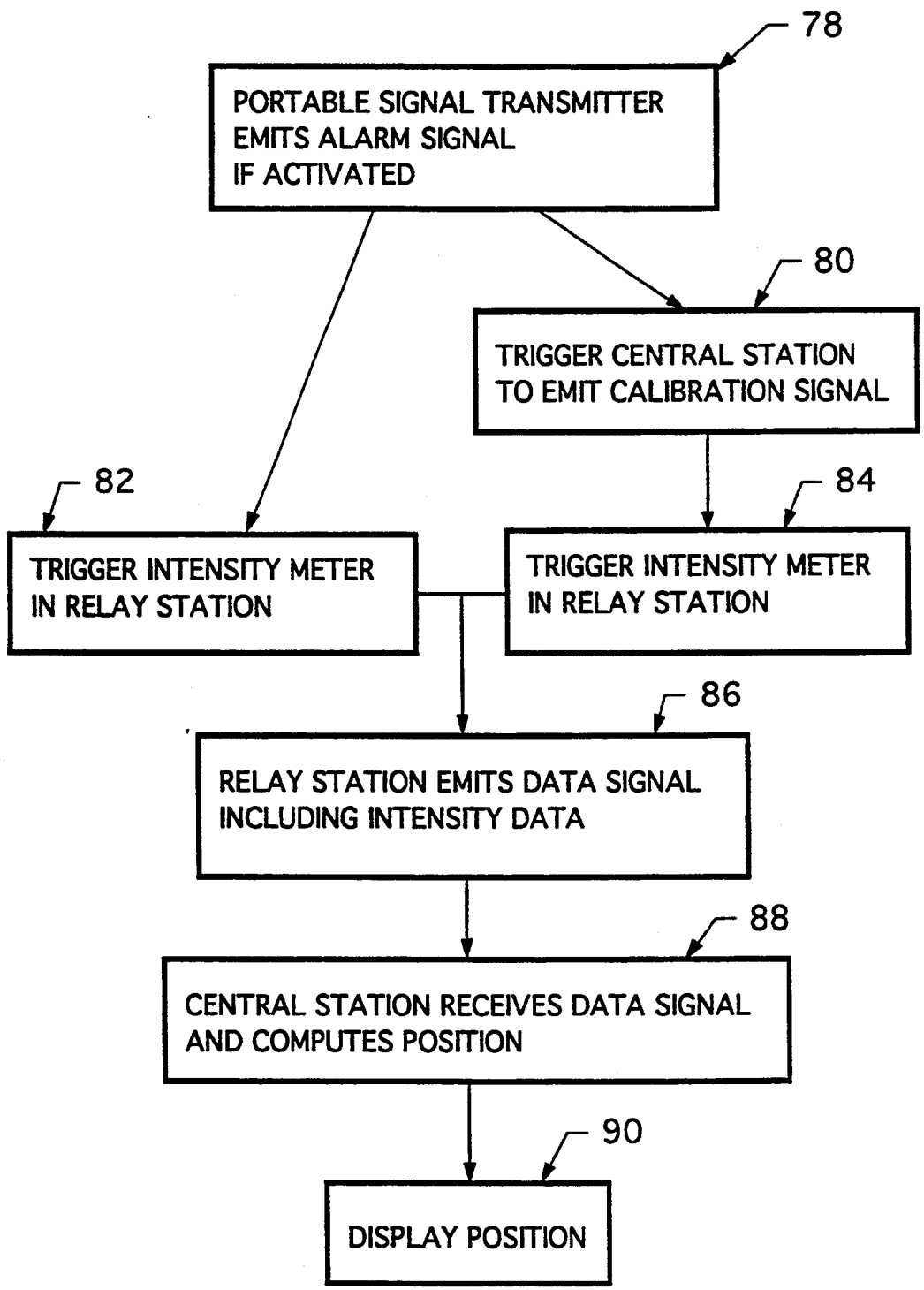
FIG. 8 is a flow chart of the alarm, calibration, and data signals for an embodiment of the security system including the relay stations and central station illustrated in FIG. 7.

FIG. 8 is a flow chart of the alarm, calibration and data signals in accordance with the embodiment of relay station and central station described with respect to FIG. 7. In a step 78, the signal transmitter 10 upon activation emits an alarm signal including an identification code for the signal transmitter. In a step 80, the central station 20" transmits an encoded calibration signal periodically or upon receiving the alarm signal from the signal transmitter 10. In a step 82, each of the relay stations 14" receives this alarm signal, and its intensity is measured by the intensity meter 76. In a step 84, the calibration signal is received by each of the relay stations 14" and its intensity is measured by the intensity meter 76 for calibration.

In a step 86, each of the relay stations emits a data signal to the central station. Each of the data signals carries information including the intensity data of both the alarm and calibration signals, as well as the identification codes of both the signal transmitter 10 and the relay station 14". In a step 88, the central station 20' receives the data signal and computes the coordinates of the signal transmitter 10. In a step 90, the calculated coordinates of the portable signal transmitter 10 are displayed on a monitor 56".

Positioning using the signal intensity for a 3D positioning system, in which four relay stations are $SN_1(x_1,y_1,z_1)$, $SN_2(x_2,y_2,z_2)$, $SN_3(x_3,y_3,z_3)$, and $SN_4(x_4,y_4,z_4)$, is calculated in the following manner. For a signal transmitter P(x,y,z) with a vertical antenna (i.e. the signal intensity is symmetry about the vertical axis), the intensity of an alarm signal from the signa transmitter P at each of the four relay stations (SN1, SN2, SN3 and SN4) is a function of distance "r," orientation $\Theta$ and a parameter "C." It can be generally expressed as:

$$S_i = C\frac{f(\theta_i)}{r_i^2} = F(C, x_i - x, y_i - y, z_i - z)$$
$$i = 1,2,3,4$$

where C is a constant depending on the signal transmitter and $\Theta$ is the orientation angle of each relay station against the symmetry axis of the signal transmitter antenna. The intensity is a function of the signal transmitter position (x,y,z), the function "$f$" depending on the specific configuration of the antenna. The coordinates of the signal transmitter P(x,y,z) in the three dimensional space are obtained by solving the above set of equations.

For a security system having six relay stations, if the antenna symmetry axis is arbitrarily oriented in angles $\alpha$ and $\phi$ against the coordinate system, then the intensity expression having additional factors due to $\alpha$ and $\phi$ for each of the six relay stations (SN1, SN2, SN3, SN4, SN5, SN6) is expressed as:

$$S_i = C\frac{f(\theta_i,\alpha,\phi)}{r_i^2} = F(C, x_i - x, y_i - y, z_i - z, \alpha, \phi)$$
$$i = 1,2,3,4,5,6$$

The coordinates of the signal transmitter P(x,y,z) in the 3D space and the orientation angles of the antenna are thus obtained by solving the above set of equations.

With respect to measurement and calibration of intensity data, signal intensities can be measured by intensity meters in each of the relay stations. For example, an alarm signal arrives at the relay station SN1 and the intensity is measured by the intensity meter as $S_{o1}$. The calibration signal arrives at the relay station SN1 and the intensity is measured by the intensity meter as $C_{o1}$. The true alarm intensity is then obtained as $S_1 = S_{o1} - C_{o1} + C_1$. The true calibration intensity, $C_1$, can be obtained either by experiment or by calculation from the predetermined positions of the central and relay station SN1. By the same procedure, the true alarm signal intensity for each of the relay stations, SN1, SN2, SN3, SN4, SN5 and SN6 respectively, is obtained. For example, $$S_i = S_{oi} - C_{oi} + C_i \quad i=1,2,3,4,5,6$$

A variety of modifications and variations of the present invention are possible in light of the above teachings. It is therefore to be understood that, within the scope of the appended claims, the present invention may be practiced otherwise then as specifically described hereinabove.

What is claimed is:

1. A security system, comprising:
    at least one portable signal transmitter responsive to a user input for emitting an alarm signal including an identification code that identifies said at least one portable signal transmitter;
    at least three relay stations positioned at predetermined locations, each relay station comprising,
        a receiver for receiving said alarm signal and a calibration signal,
        a timer responsive to said receiver for measuring a time interval between receipt of said alarm signal and said calibration signal by said receiver, and
        a transmitter responsive to said timer for transmitting a data signal including said time interval, said signal transmitter identification code and a relay station identification code; and
    a central station positioned in a predetermined location, said central station comprising,
        a receiver for receiving said data signal from each of said relay stations and said alarm signal from said alarm signal transmitter,
        a transmitter responsive to said receiver for transmitting said calibration signal, and
        a data processor having memory resident instructions for processing said data signal to calculate coordinates of said signal transmitter.

2. The security system of claim 1, wherein said transmitter of said central station transmits said calibration signal periodically.

3. The security system of claim 1, wherein said transmitter of said central station transmits; said calibration signal upon receipt of said alarm signal.

4. The security system of claim 1, wherein said timer of each of said at least three relay stations is synchronized by a synchronizing signal from said central station.

5. A security system, comprising:
    at least one portable signal transmitter responsive to a user input for emitting a first alarm signal including an identification code that identifies said at least one portable signal transmitter;
    at least three relay stations positioned in predetermined locations, each relay station comprising,
        a receiver for receiving said first alarm signal and a first calibration signal, and
        a transmitter responsive to said receiver for transmitting a second alarm signal including a first alarm signal identification code and a relay station identification code upon receipt of said first alarm signal by said receiver and for transmitting a second calibration signal including a first calibration signal identification code and said relay station identification code upon receipt of said first calibration signal; and
    a central station positioned in a predetermined location, comprising
        a receiver for receiving said first alarm signal, and said second calibration signal and said second alarm signal from each of said relay stations,
        a timer for measuring a time interval between said second alarm signal and said second calibration signal for each of said relay stations,
        a transmitter responsive to said receiver for transmitting a first calibration signal, and
        a data processor having memory resident instructions for processing data including said time interval for each of said relay stations to calculate coordinates of said the signal transmitter.

6. The security system of claim 5, wherein said transmitter of said central station transmits said first calibration signal periodically.

7. The security system of claim 5, wherein said transmitter of said central station transmits said first calibration signal upon receipt of said first alarm signal.

8. A security system, comprising:
    at least one portable signal transmitter responsive to a user input for emitting an alarm signal including an identification code that identifies said portable signal transmitter;
    at least three relay stations positioned at predetermined locations, each relay station comprising,
        a receiver for receiving said alarm signal and a calibration signal,
        an intensity meter responsive to said receiver for measuring a signal strength of said alarm signal and a calibration signal, and
        a transmitter responsive to said intensity meter for transmitting a data signal including said signal strength of said alarm signal, signal strength of said calibration signal, a relay station identification code, and signal transmitter identification code; and
    a central station positioned in a predetermined location, said central station comprising,
        a receiver for receiving said data signal from each of said relay stations and said alarm signal from said alarm signal transmitter,
        a transmitter responsive to said receiver for transmitting said calibration signal, and
        a data processor having memory resident instructions for processing said data signal to calculate coordinates of said signal transmitter.

9. The security system of claim 8, wherein said transmitter of said central station transmits said calibration signal periodically.

10. The security system of claim 8, wherein said transmitter of said central station transmits said calibration signal upon receipt of said alarm signal.

* * * * *